J. J. QUERTINMONT.
APPARATUS FOR MAKING SHEET OR PLATE GLASS.
APPLICATION FILED DEC. 7, 1907.
936,664.
Patented Oct. 12, 1909.
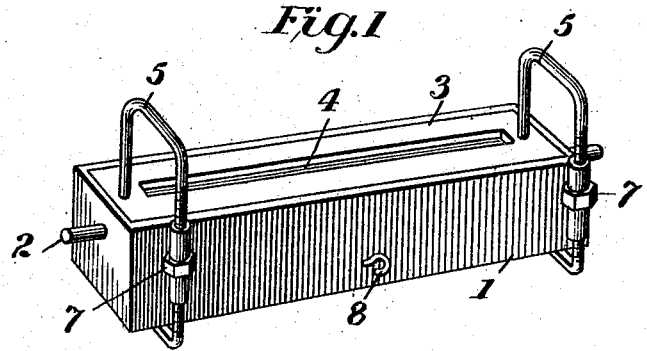
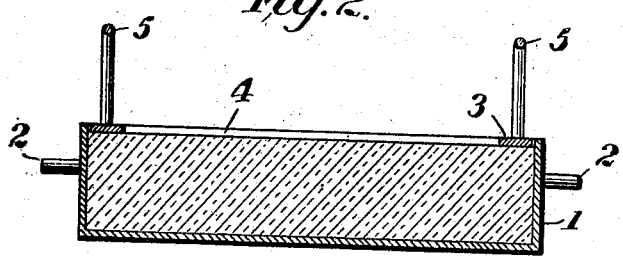
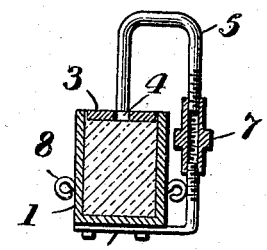
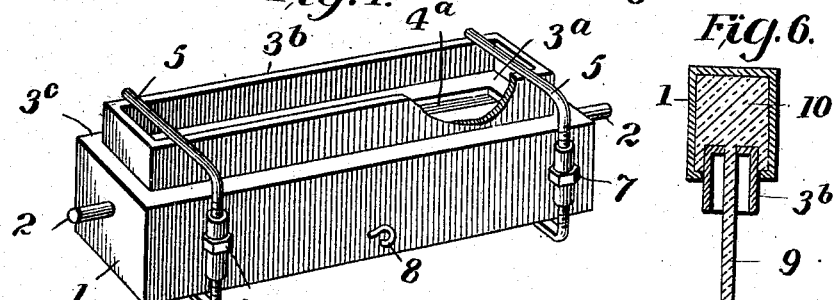
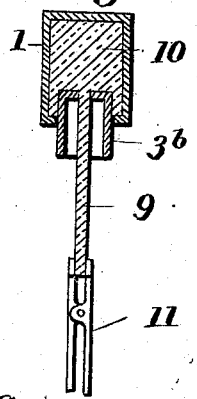
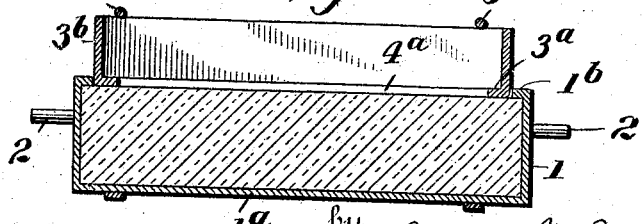
Witnesses
Inventor
Jules J. Quertinmont
Attorney

UNITED STATES PATENT OFFICE.

JULES J. QUERTINMONT, OF POINT MARION, PENNSYLVANIA.

APPARATUS FOR MAKING SHEET OR PLATE GLASS.

936,664.  Specification of Letters Patent.  Patented Oct. 12, 1909.

Application filed December 7, 1907. Serial No. 405,584.

*To all whom it may concern:*

Be it known that I, JULES J. QUERTINMONT, a citizen of the United States, residing at Point Marion, in the county of Fayette and State of Pennsylvania, have invented certain new and useful Improvements in Apparatus for Making Sheet or Plate Glass, of which the following is a specification.

My invention relates to the manufacture of glass, and is particularly applicable to the various varieties of sheet, window or plate glass.

The matters of novelty consist, in an improved apparatus for the production of glass in plates or sheets from a receptacle containing the material in fluid condition, this being accomplished without contact with or handling of the surface of the plate while cooling and solidifying by any tools or implements. This is a feature of very great importance, for thereby I am enabled to retain the native brilliancy and luster of the glass, thus producing a very superior product in the simplest possible manner.

In the following description and accompanying drawings the features of my invention are set forth fully, the apparatus shown being illustrated in a simple form and without immaterial auxiliary parts, that its salient features may be the more readily comprehended.

Referring to the said drawings,—Figure 1 shows a perspective view of one form of apparatus for carrying out my invention. Fig. 2 is a central vertical longitudinal section through the same, the receptacle being shown full of molten glass. Fig. 3 is a transverse vertical section of the same apparatus adjacent an end thereof. Fig. 4 is a perspective of a modification. Fig. 5 is a central vertical longitudinal section through the form of Fig. 4, and Fig. 6 is a view showing the manner of forming plates or sheets of glass from the molten mass in the trough or tank.

Like reference characters are used to designate like parts in each of the several views.

Referring to Figs. 1 to 3, 1 is a receptacle of iron or any suitable material in the form of a shallow trough or tank somewhat longer than the plates of glass to be made. This trough is shown as rectangular but its form in horizontal section is immaterial so long as such section at different points does not vary. Said trough is preferably provided with suitable trunnions 2, whereby it may be pivotally suspended from a crane or like support and filled with molten glass by dipping in a glass reservoir tank.

Fitted to slide in the trough 1 is a follower-cover or piston 3, preferably of iron, which conforms in shape to the inside horizontal section of such trough. The said follower 3 is provided with a long slot 4, the size of such slot being determined by the dimensions of the glass plates it is desired to produce.

5, 5 are members arranged to engage and press inward the cover piston 3. In the embodiment shown these members consist of adjustable rod sections 5, secured at one end to the bottom of the trough adjacent its extremities as shown at 6, and bent over at the opposite ends to engage the said cover 3. Said rod sections are united by a turnbuckle 7, which may be manipulated as will be readily apparent to force the cover piston 3 inward, or to allow the same to be withdrawn at option. While I have illustrated these rod members adjustable by a turnbuckle as the means for acting upon the cover piston, I desire it to be clearly understood that I do not limit myself to such a device, as I am well aware that a wide variety of operating devices to attain the same result might be used without departing from my invention in its broader aspect which contemplates the employment of any suitable device to exert pressure upon the cover piston 3.

The trough 1 is preferably provided with hooks at convenient places on its sides to enable it to be easily engaged by a suitable device for tilting it upon its trunnions.

In Figs. 4 and 5 I show a slight modification in the design of the trough and cover piston therefor. In this form the trough $1^a$ is provided with an inwardly extending flange $1^b$ at its top and the cover piston $3^a$ has an upstanding flange $3^b$ around its periphery for engagement with said inwardly extending flange $1^b$ to form a close sliding fit therewith, and by means of the pocket formed between the flanges $1^b$ and $3^b$ and end walls of trough $1^a$, a closer fit is secured.

It is apparent that in either case the object is to cause the molten glass to flow outward through the long slot 4 which is of a width corresponding to the thickness of glass desired, and to prevent the passage of any of the molten mass around the periphery of the cover piston.

The steps of using my improved apparatus may now be readily understood. I first dip the trough 1 in the molten glass, preferably swinging it upon trunnions 2 from a suitable crane and by means of an actuator engaging one of the lugs or hooks 8. I thereupon place the cover piston 3 in position within the trough and resting on top of the molten mass therein. Then the cover engaging devices 5, 5 are brought into position and adjusted against the cover piston by means of the turnbuckles 7.

The trough 1 and its contents having been brought to a convenient position by its supporting crane, it is swung upon its trunnions 2 to inverted position whereupon a sheet of the molten glass may issue from the slot 4, as shown in Fig. 6. It will be apparent that such issuance of the glass sheet will naturally result from the action of gravity and it will also be understood that such issuance may be accelerated at will by compression upon the piston cover 3, such compression being exerted by manipulation of the turnbuckles 7, 7. As shown in Fig. 6, the edge of the glass sheet 9 formed from the body of glass 10 within the trough may be grasped by a pair of tongs 11 to be manipulated as may be necessary, but as will be seen, the surfaces of the main body of the glass sheet are not at all touched by any foreign substance or implement during its cooling and solidifying period, and hence the original virgin luster and brilliancy of the glass are preserved to the highest possible degree, thus producing a very superior article.

Having now described my invention, what I claim as new and desire to secure by Letters Patent is as follows:—

1. An apparatus for making glass comprising a trough arranged to be rotated and a combined cover and follower therefor having a slot therein of extended length.

2. An apparatus for making glass comprising a trough having trunnions on its ends and a combined cover and follower therefor having an elongated slot therein, the long sides of said slot being straight and parallel.

3. An apparatus for making glass comprising a rotatable trough, a cover-piston fitted to slide within said trough, said cover-piston having an elongated slot therein, and means for exerting pressure upon said cover-piston.

4. An apparatus for making glass comprising a trough having an inwardly-extending flange about its top, and a cover-piston fitted to said flange having an upstanding flange for extended engagement with said trough flange, said cover-piston also having an elongated slot therein.

5. An apparatus for making glass comprising a trough having trunnions fixed to its ends, a cover-piston fitted to engage said trough, said cover-piston having an elongated slot therein, and means to exert pressure upon said cover-piston, said means consisting of extensible bent rod clamps and turnbuckles for adjusting the same.

In testimony whereof I affix my signature in presence of two witnesses.

JULES J. QUERTINMONT.

Witnesses:
W. T. DEVLIN,
FLOUSE DULIERE.